Aug. 10, 1965  S E. SNAIR ET AL  3,199,342
ZIPPER TESTER
Filed March 13, 1962  3 Sheets-Sheet 2

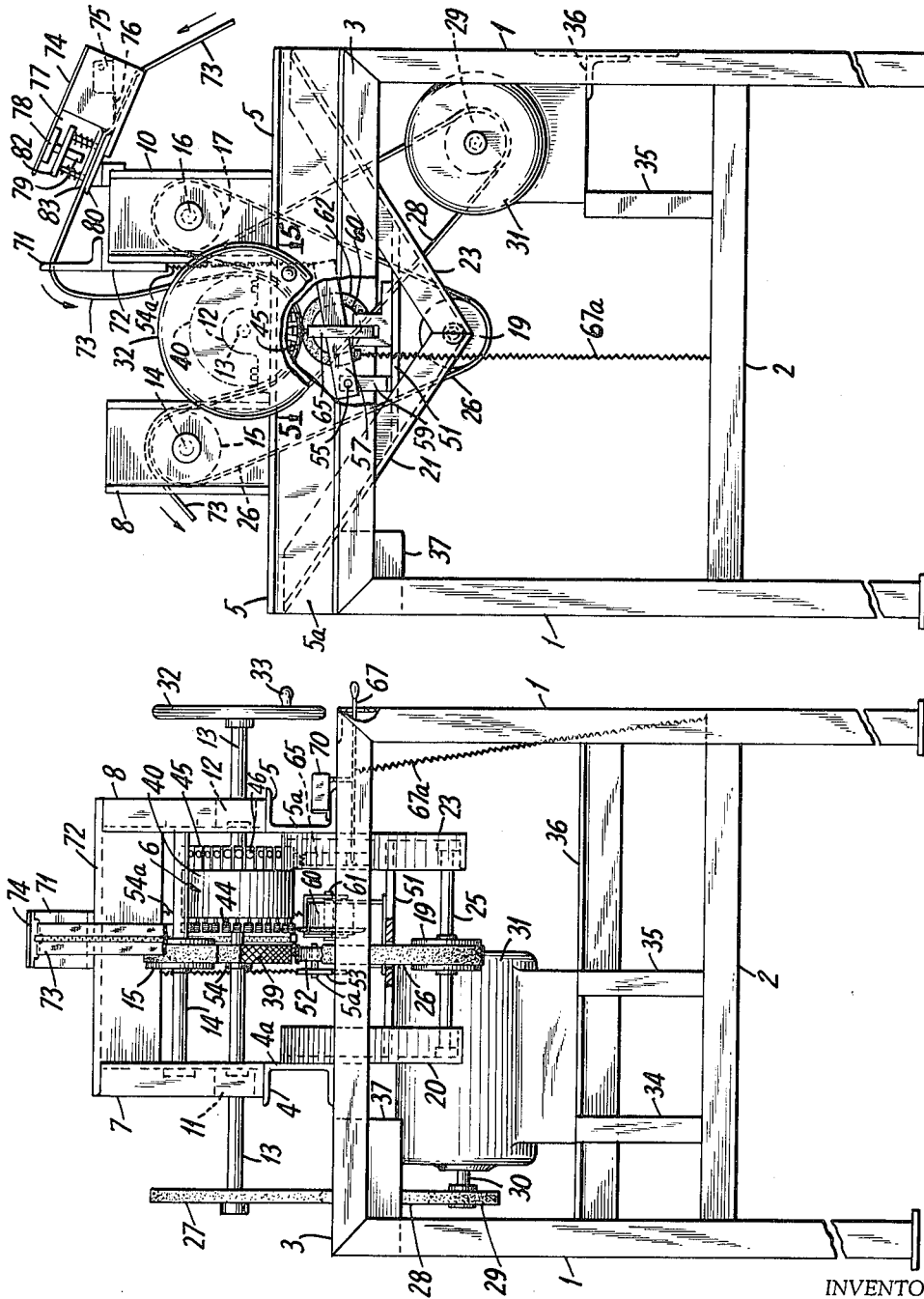

INVENTORS.
S. EDWIN SNAIR
MELVIN I. LIPSHUTZ
BY
ATTORNEY.

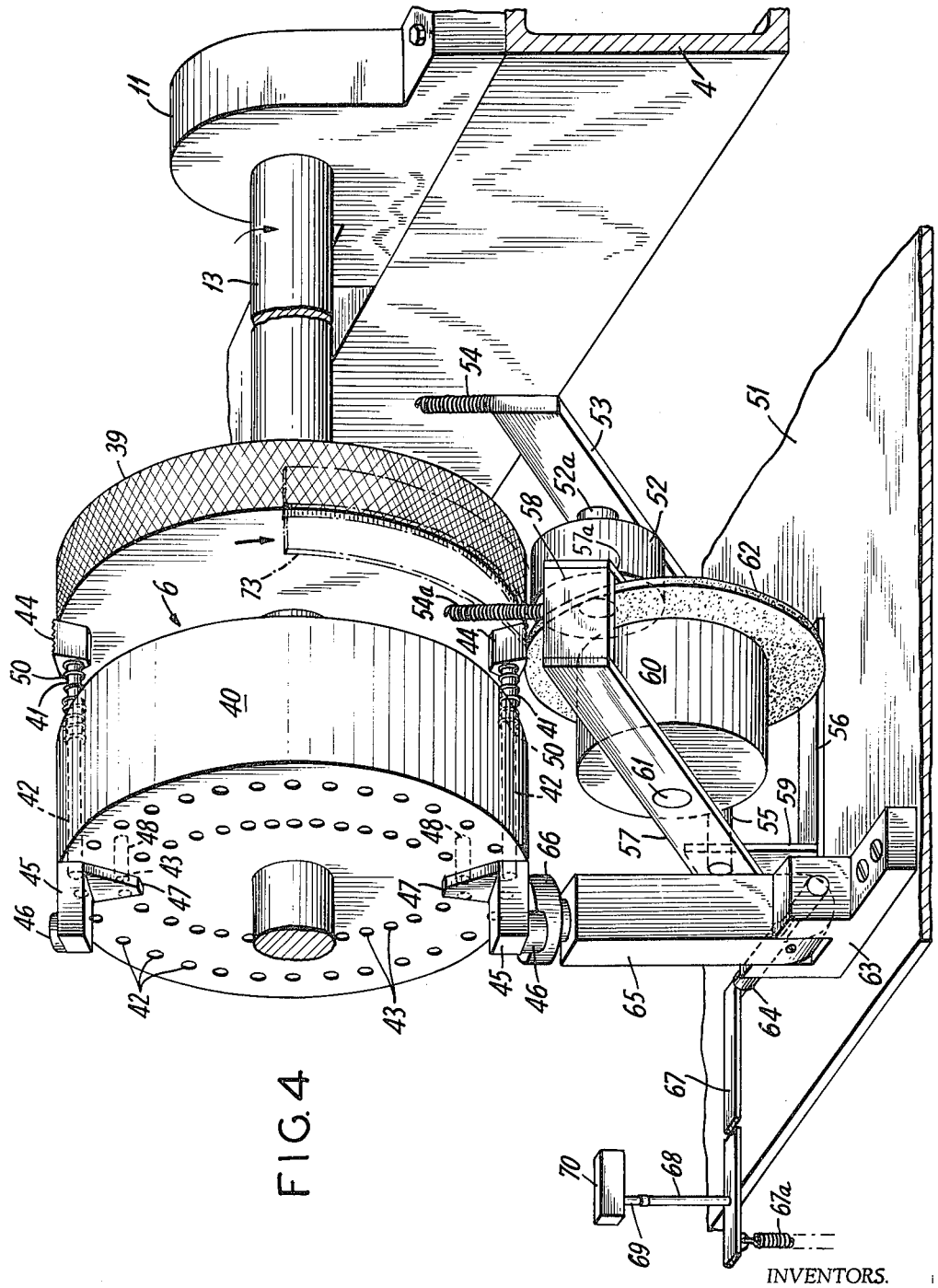

United States Patent Office 3,199,342
Patented Aug. 10, 1965

3,199,342
ZIPPER TESTER
S Edwin Snair, Paramus, and Melvin I. Lipshutz, Washington Township, N.J., assignors, by mesne assignments, of thirty-seven and five-tenths percent each to said Snair and said Lipshutz, and twenty-five percent to Eugene J. Kalil, Bristol, Conn.
Filed Mar. 13, 1962, Ser. No. 179,318
5 Claims. (Cl. 73—95)

This invention relates to a quality control testing device for testing the quality of flexible tape material and, in particular, to a device for testing the holding quality of slide fasteners, such as zippers and the like, particularly with respect to maintaining quality control during their manufacture.

Slide fasteners, such as zippers and the like, as applied for detachably joining together edges of flexible material, generally comprise a plurality of links linearly arranged along adjoining edges of material which are caused to be connected together by merely pulling a mounted tab slidably associated with the links.

In the production of zippers and similar fasteners, it is important that the zipper meet certain specification requirements with regard to its holding strength. A manufacturing defect in one or more of the links may render a particular unit or portion of a zipper defective to the point of making it useless for the intended purpose. In order to insure a desirer level of quality, the holding strength of the zipper is spot tested by batch sampling, that is by subjecting a sample of a production batch to a destructive test. One spot testing procedure which is employed comprises taking a portion of a zippered material from a batch, holding it taut by gripping the material edges transversely and applying veritical pressure with a tool on top of the linked zipper with a force that causes the links to separate. If the links part at an applied force below a reference standard, then the batch tested is set aside as "seconds" with a consequent decrease in its value.

Assuming a batch might contain up to several hundred or a thousand or more feet, it will be appreciated that the decrease in value of a batch which fails to meet specification requirements could be considerable, even though a large portion of that batch might very well be of first rate quality. One method of minimizing the amount of "seconds" would be to increase the number of spot tests for a given production batch. However, increasing the number of spot tests per batch has its economic disadvantages and also imposes a bottleneck on production.

It would be desirable, therefore, to provide a device which would be capable of continuously testing the holding strength of zippers or other fasteners along successive unit lengths thereof, regardless of the total length of a given batch. With such a device, it would then be possible to earmark defective portions of a batch which could then be thereafter cut out and removed and thereby assure accurately and surely the setting aside of production runs of first rate quality.

We have now developed such a device and, as far as we are aware, no such device has been available prior to our invention.

It is thus an object of our invention to provide a device for continuously testing the physical quality of flexible tape material.

Another object is to provide a device for continuously testing the holding strength of fasteners mounted linearly along adjacent edges of flexible material.

A still further object is to provide a device for continuously testing mounted slide fasteners of the zipper type and the like with the aim of revealing defective portions thereof without destroying those portions of the slide fasteners which meet specification requirements.

These and other objects will more clearly appear from the following disclosure, the appended claims and the accompanying drawings, wherein:

FIGS. 1 to 3 show in front elevation, side elevation and plan view, respectively, an embodiment of the zipper testing device provided by the invention;

FIG. 4 depicts partially in three dimensions the novel combination of elements which coact in testing a zipper element passing through the device;

In its broad aspects, the novel device comprises a combination of cooperable elements which include means for feeding tape material and the like, for example flexible material connected together at their adjacent edges by fasteners, to a gripping assembly adapted to grip the material transversely along its edges. The assembly comprises a first portion which grips the material along one edge in continuous fashion along successive increments of the edge while holding said material against displacement in the transverse direction. The assembly also has a second gripping portion adapted to grip continuously the tape material along the opposite edge but transversely movable relative to the tape while being adapted to apply continuously a transverse pull on the material, said second portion being biased transversely into the path of feed of said tape material. The pull applied by the second portion of the gripping assembly is adjusted so that it is just sufficient to detect weak connections in the joined material. Where a defect in the material is detected, the applied pull causes the material to separate at the defect, whereby the movably mounted gripping element moves transversely away from the material and actuates a sensing means which is adapted through associated means to stop the machine. The defective area of the material is marked to be cut out later and the testing thereafter continued.

Figure 3:
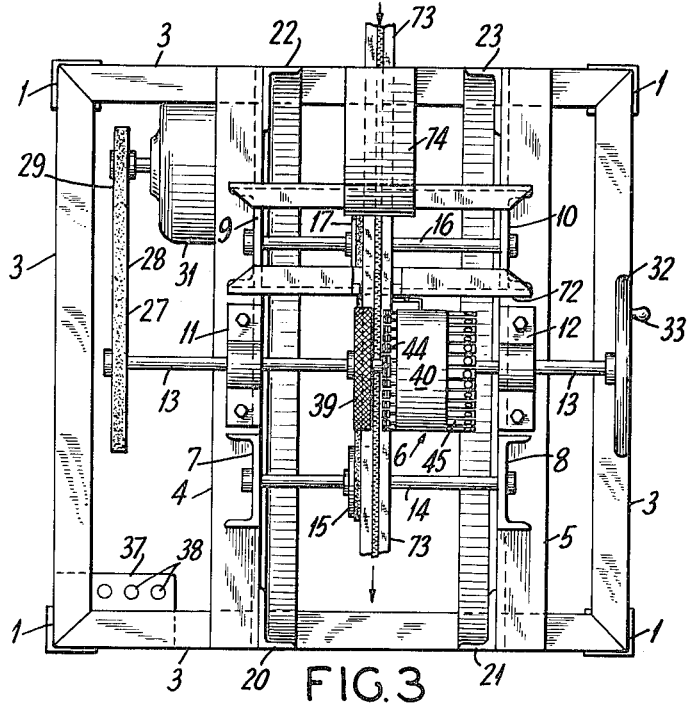

In order to obtain a clearer understanding of the invention, reference is made to FIGS. 1 to 3 which shows one embodiment of the device comprising a frame having four legs 1 of angle iron joined to horizontally arranged braces of angle irons by welding or other means, said braces comprising four intermediate braces 2 and four top braces 3 of generally the same angle sizes as the legs, for example 1½ by 1½ inches by ¼ inch thick.

Two channels 4 and 5 are arranged parallel to each other across the top braces for supporting gripping assembly 6, with their webs 4a and 5a opposing each other, the channels being fixed at one of their legs to the top braces by, for example, welding. Supported vertically and fixed on the top leg of channels 4 and 5 are two pairs of similar channels comprising a forward pair (note FIG. 3) of channels 7 and 8 and rearward pair of channels 9 and 10. Channels 4 and 5 also support, intermediate the aforementioned pair of channels, pillow blocks 11 and 12 which support shaft 13 on bearings thereon, said shaft axially supporting gripper assembly 6 to be described in more detail later.

Mounted between and through forward channels 7 and 8 (note FIGS. 1 and 3) is a pulley shaft 14 mounted on bearings having a pulley 15. Likewise, mounted between and through rearward channels 9 and 10 (note FIG. 3) is a pulley shaft 16 mounted on bearings having a pulley 17, said pulleys 15 and 17 being adapted with a third pulley to support an endless belt, said third pulley being arranged intermediate but below said first two pulleys.

The above-mentioned third pulley which is designated as 19 is supported on a shaft 25 mounted between a set of angle irons 20 to 23 fixed between channels 4 and 5 on webs 4a and 5a (note FIGS. 1 to 3), the angle irons inclining downward from the channels to below horizontal braces 3. As shown in FIG. 2, angles 21 and 23 converge into a "V" and are welded at the mitre joint shown 24. Similarly, on the other side, angles 20 and 22 similarly converge coincident with 21 and 23, each pair of angles supporting shaft 25 upon which the third pulley 19 is mounted. Coupled to all three pulleys is an endless belt 26 which is driven by contact with gripping assembly 6 as will be apparent from the further description to follow.

Shaft 13 which axially supports gripping assembly 6 has a belt driven pulley 27 coupled via a belt 28 to driving pulley 29 mounted on driving shaft 30 of motor 31. The other end of shaft 13 has a manually operable wheel 32 with crank 33 for use in manually turning the gripping assembly when setting up the device for a production run.

Motor 31 is supported beneath the top of the frame via legs 34 and 35 and at the back by angle iron 36. A switch box 37 is provided having button switches 38 or the like for starting and stopping the motor. Wires connecting the motor to the box and to a source of power are not shown since such conventional circuitry is well known to those skilled in the art.

The gripping assembly 6 mounted on shaft 13 has a gripping portion comprising a flat disc-like cylinder 39 rigidly keyed on said shaft and a solid cylinder 40 spaced therefrom and also rigidly keyed to said shaft. The cylindrical disc 39 has a knurled surface as shown in FIGS. 1 and 3. Cylinder 40 has mounted through it just below its cylindrical surface along radial spacings a plurality of slidably mounted pins, one end of each having mounted thereon gripping fingers adjacent the knurled disc, the other end of each having mounted thereon a cam lug. The gripping assembly is shown in more detail in the partial three-dimensional representation of FIG. 4.

Referring to FIG. 4, a segment of shaft 13 is shown extending from pillow block 11 which is supported by channel 4. Gripping assembly 6 is shown comprising knurled disc 39 spaced from cylinder 40, both being fixed to shaft 13. Cylinder 40 has associated with it a plurality of slidably mounted pins 41 of which only two are shown for purposes of clarity. The pins are slidably mounted through holes 42 (for example 30 pin-mounting holes) which are radially spaced about the side face of the cylinder and pass longitudinally therethrough. In addition to these holes, guide holes 43 are also provided placed along the same radial line as pin-mounting holes 42. Guide holes 43 are blind holes, the purpose of which will be presently apparent.

Each of the pins 41 has fixed at one end next to the knurled disc 39 serrated fingers 44 and a cam lug 45 at the other end, having a cam wheel 46 mounted thereon and a tongue 47 extending downwardly therefrom from which extends a guide pin 48 which projects into guide hole 43 so as to keep the finger assembly from wiggling or turning during rotation of the gripping assembly. The diameter of the pin-mounting holes at the opposite face of cylinder 40 is slightly enlarged to receive biasing spring 50 which surrounds pin 41. The spring acts to keep the finger 44 in its outermost position near knurled disc 39. As stated hereinabove, every pin-mounting hole has associated with it a pin and finger assembly the same as the two shown at the top and bottom of cylinder 40 of FIG. 4 (note FIGS. 1 and 3).

Figure 5:
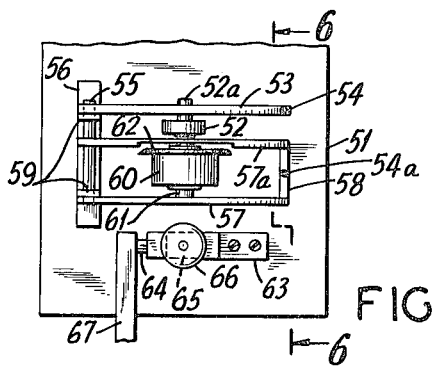
FIG. 5 is a plan view on a reduced scale of the elements shown in FIG. 4 as taken along line 5—5 of FIG. 2.

On a platform 51 which is supported beneath the gripping assembly 6 by converging angle irons 20 to 23 (note FIGS. 1, 2 and 4 to 6), additional mechanical elements are provided for coacting with the various elements of the gripper assembly. These include a follower wheel 52 supported via a stub shaft 52a fixed to a pivotally mounted lever arm 53 biased in the upward position by a spring 54 connected to an overhanging portion above the gripping assembly. The lever is pivotally mounted at 55 (note FIG. 5) to an upstanding support 56. The purpose of the follower wheel is to maintain pressure of endless belt 26 against the knurled surface of disc 39 as the belt (note FIG. 6) contacts the lower periphery of the disc.

Figure 6:
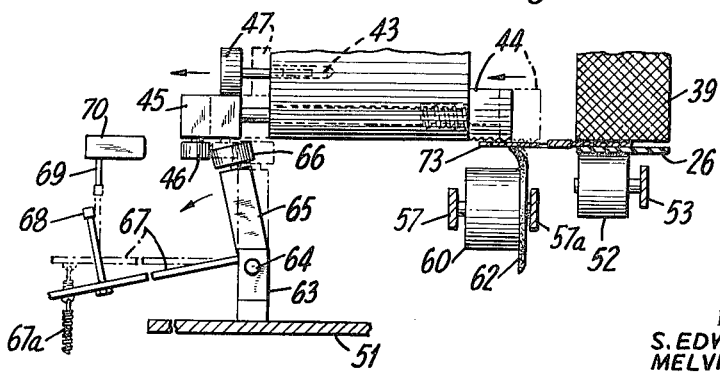
FIG. 6 is an elevational view taken along line 6—6 of FIG. 5 as seen in the direction of the arrows but enlarged in order to show more clearly the elements which coact during testing.

In addition platform 51 also supports a yoke and rubber wheel assembly for cooperating with each of the fingers 44 as they come in contact with the rubber wheel. The yoke comprises two parallel levers 57 and 57a held by cross bar 58 at one end and pivotally mounted at the end at 59 associated with upstanding support 56. Between the two lever arms 57 and 57a, rubber wheel 60 is rotatably supported on shaft 61, said wheel having an integral flexible rubber flange 62 at one side thereof adapted to maintain pressure contact with finger 44 as shown in FIG. 6.

A third element supported by platform 51 is a cam assembly (not FIGS. 4 to 6) comprising a fixed bracket 63 to which is pivotally mounted on shaft 64 an upright cam support 65 having at its free end a cam 66 adapted to cooperate with cam follower 46 on the movable gripper assembly. A lever arm 67 is provided extending transversely from shaft 64. The lever arm is biased downward by a tension spring 67a connected to a lower portion of the machine. The tension of the spring is calibrated so that the contact of cam follower 46 with cam 66 will be such as to tend to cause finger 44 to move towards the left (note FIGS. 4 and 6) and apply by friction a pull on the zipper as shown in FIG. 6. The pivoting movement of cam support 65 is limited by the transverse displacement of the movable finger and since cylinder 40 is completely surrounded by cam lugs 45 and followers 46, the movement of upright cam support is contained within the maximum possible displacement of the movable gripper, i.e. fingers 44.

In order to sense any out-of-normal pivoting of cam support 65, a sensing finger 68 is provided integral with lever arm 67 and projecting upwards into the path of and in contact wtih feeler element 69 of microswitch 70. Microswitch 70 is connected to control box 37 in the usual manner and as long as the positioning of cam support 65 is normal, the machine is in operation. If the frictional pull of finger 44 on a defective zipper (note FIG. 6) is such as to cause the zipper links to give, cam lug 45 moves to the left, causes lever arm 67 to go down, thus deactuating microswitch 70 and causing the machine to shut down until the defect is marked and the machine cleared.

The elements shown three-dimensionally on platform 51 of FIG. 4 are indicated in FIG. 1 by breaking away part of belt 26 and also in FIG. 2 by breaking away a portion of channel 5 and top angle 3. Thus in FIG. 1, lever arm 67 is shown extending from the frame but in cooperable relation with cam support 65 shown in dotted line and microswitch 70. The break-away detail shown in FIG. 2 becomes clearly discernible as to parts by comparison to FIGS. 4 to 6.

The feed of tape material through the machine, such as mounted zippers, is effectuated by means of the frictional pull of belt 26 which is endlessly coupled to idle pulleys 15, 17 and 19. The motor is used to maintain positive drive on shaft 13 via driving pulley 29 and driven pulley 27. Thus, as shaft 13 rotates, gripper assembly 6 rotates. Since endless belt 26 is brought down beneath knurled disc 39 (note FIGS. 2 and 6) and maintained in frictional contact with its knurled surface via biased follower roller 52 (note FIGS. 4 and 6), then belt 26 is simultaneously caused to be driven.

As shown in FIG. 6, belt 26 is arranged so as to contact the surface of disc 39. In feeding a length of zipper to the machine, the zipper is placed on the belt so as to straddle it along one edge, so that the one edge of the zipper is tightly pressed against the knurled surface of disc 39. To insure that the edge portion of the zipper does not drift from its position on the belt, a guide 71 is provided at the top of the machine (note FIGS. 1 and 2). An inverted angle 72 is bridged by welding across the top of rearward channels 9 and 10 as shown and guide 71 secured to it. The top of the guide is indented to receive the width of zipper element 73, the center of the indent being further indented to receive the width of the zipper links themselves. So long as the zipper is in the guide element, it will maintain its position on the belt.

In feeding the zipper element to the machine, the zipper is preferably passed through a sensing device to detect obvious snarls, twists, knots, and the like, that might accidentally occur in a batch of zippered material. Thus, referring to FIG. 2, a mounting 74 is provided secured via an angle iron to channels 9 and 10, said mounting having a first compartment containing a microswitch 75 or the like having an extending finger 76 adapted to feel the material as it passes through the compartment. Assuming the material contains a very obvious snarl, the finger 76 is caused to lift by pressure against it and actuate the microswitch which is connected to conventional circuitry (not shown), to shut off the motor.

Assuming the zippered material contains a defect not detectable in the first compartment, it passes to a more sensitive device in a second compartment (also FIG. 2) which also contains a sensing switch 78, such as a microswitch or the like, fixed to the top of compartment 77 and also having a sensing element 79 projecting downward. Fixed to the bottom of the compartment is a metal plate 80. Protruding upward from and fixed at bottom plate 80 or four pins 81 which are also connected to a plate 82. A floating plate 83 is provided which is biased against the fixed bottom plate via biasing springs about pins 81 which pins pass through the floating plate as shown. As zippered material 73 now passes through the second compartment, the defect, if any, causes floating plate 83 to move up against sensing finger 79, actuate the microswitch and shut off the machine. After clearing the machine, the zippered material then passes through guide 71, brought down to belt 26 which winds about the bottom of disc 39. The edge of the zipper which is supported by the belt (note FIG. 6) is pressed up against the knurled surface of disc 39 so as to be firmly gripped thereby.

The opposite edge of the zipper passes between the serrated surface of movable gripper 44 and the flexible flange 62 of rubber wheel 60. As the zipper assembly rotates to pull the zipper through, the action of cam 66 on cam follower 46 causes a pull stress to be continually applied to the one zipper edge by movable gripper 44. If a weakness is detected, the zipper separates as described hereinbefore, causing the movable gripper to move transversely to the left (FIG. 6) and shut off the power via microswitch 70.

Since cylinder 40 contains a plurality of closely spaced movable gripping fingers, it is apparent that substantially every inch of zippered material is subjected continuously to the same test. The test is only destructive to the defective material and not to the material of first rate quality. Thus, once the defect has been located, it can be cut out and the remainder of the batch set aside as material of first rate quality.

The amount of pull to be applied across a zipper element will be determined by the amount of pre-set tension put on spring 67a connected to lever arm 67. Where different specifications prevail, it may be necessary to work up a calibration chart. One method would be to have a spring scale connected between spring 67a and an anchor point and calibrate the settings according to the pounds of pull registered on the scale.

While the sensing element 70 is shown as a microswitch, it will be appreciated that other types of sensors may be employed. For example, an optical sensor may be employed based on a photoelectric cell arrangement. In this type of arrangement, the element which moves may be calibrated to interrupt a source of light to the photoelectric cell when a zipper failure is detected, whereby the machine is shut off. Or, if desired, a capacitive sensor may be employed wherein the element which moves when a zipper defect is detected is caused mechanically to change the frequency in a tuning circuit, which change results in a machine shut down. Or the sensor may comprise a force transducer. One type may comprise carbon granules against which pressure is applied by a moving element causing a change in resistance, which change is utilized to shut off a circuit. Another alterative device may be a relay actuated by a moving element coupled to the movable gripper.

Where the product tested is wound up on reels, a take-up reel assembly may be used in conjunction with the device. Thus, as the zippered material comes off belt 26 at pulley 15 (note FIG. 2), it would then be led to a reeling assembly associated with that portion of the testing device. Such an assembly may comprise a reel fixed on a shaft driven by a constant torque servo motor so that as the material wound on the reel increases in diameter, the servo motor will adjust itself to suit its torque requirements.

While the device has been described for use in testing zippers, it will be appreciated that it could be used in testing any form of tape material, such as strip, ribbon and the like, where subjecting the material to a transversely applied stress is a requisite in determining its quality.

While the present invention has been described in conjunction with a preferred embodiment, it is to be understood that modifications and variations may be resorted to without departing from the spirit and scope of the invention as those skilled in the art will readily understand. Such modifications and variations are considered to be within the purview and scope of the invention and the appended claims.

What is claimed is:

1. A device for detecting flaws in tape material and the like which comprises, a frame supporting a rotatably mounted shaft, means for rotating said shaft, a cylinder mounted on said shaft, a circular disc mounted on said shaft and spaced axially from said cylinder, said cylinder having radially disposed about an edge face thereof adjacent said circular disc a gripping finger assembly comprising a plurality of gripping fingers each mounted on a slidable pin extending through the cylinder and parallel to its axis, each of said pins having gripping means on one end and cam follower means on its opposite end outside the cylinder, means operably associated with each pin for biasing each gripping finger in home position towards the circular disc, means for feeding tape material in a path below the cylinder but between the gripping means and the circular disc, rotatable idler means for maintaining a portion of the tape material in contact against the surface of the disc and against a gripping finger, cam actuating means adapted to contact the cam follower means of each of the movable gripping fingers and apply a force along each of the fingers when in the gripping position so as to apply a pull to an edge of the tape material, and means operably associated with said cam actuating means for sensing the movement thereof upon detection of a flaw, said means being adapted through associated means to stop the movement of said tape material.

2. The device of claim 1 wherein the means for feeding the tape material to the device has associated therewith means for sensing any snarls, twists and knots in the material fed to the device and accordingly stop said device.

3. A device for detecting flaws in tape material and the like, which comprises, a frame supporting a rotatably mounted shaft, means for rotating said shaft, a cylinder mounted on said shaft, a circular disc mounted on said shaft and spaced axially from said cylinder, said cylinder having radially disposed about an edge face thereof adjacent said circular disc a gripping finger assembly comprising a plurality of gripping fingers each mounted on a slidable pin extending through the cylindrical body parallel to its axis, each of said pins having gripping means on one end and cam follower means on its opposite end outside the cylinder, means operably associated with each pin for biasing each gripping finger in home position towards the circular disc, means for feeding tape material in a path below the cylinder but between the gripping means and the circular disc, first means beneath the circular disc adapted to maintain an edge portion of the tape material in contact against the surface of the disc, second means below the gripping finger assembly for maintaining the opposite edge portion of the tape material against a gripping means, third means associated with said gripping finger assembly comprising a movable cam adapted to contact the cam follower means of each of the gripping fingers and apply a force along each of the fingers when in the gripping portion so as to apply a pull to an edge of the tape material, and means operably associated with said movable cam means for sensing the movement thereof upon detection of a defect, said means being adapted through associated means to stop the movement of said tape material.

4. A device for detecting flaws in tape material comprising a frame, a shaft rotatably supported by said frame, means for rotating said shaft, a cylinder mounted on said shaft, a circular disc mounted on said shaft spaced axially from said cylinder, said cylinder having radially disposed about an edge face thereof adjacent said circular disc a plurality of transversely extending gripping fingers each mounted on a slidable pin which extends through the cylinder parallel to its axis, each of said pins having on its opposite end outside the cylinder cam follower means, means operably associated with each pin for slidably biasing each of the gripping fingers towards said circular disc, a plurality of pulleys supported by said frame about said rotatable shaft and coupled together with an endless belt, said belt passing beneath said circular disc in driveable contact with a surface portion thereof, means for feeding the tape material beneath the cylinder while supported upon said endless belt as it passes beneath the disc and contacts its surface portion, an idler wheel supported beneath said disc for maintaining pressure against the disc and belt partially supporting said tape material, a resilient idler wheel supported below said cylnder and beneath the extending fingers thereof and adapted to apply pressure against the tape material and successively to each of said fingers when in contactable relation with said tape, cam actuating means for contacting each of the cam follower means of said gripping fingers whereby a force is applied successively to each of the fingers to effect a transverse pull on the tape material gripped by said fingers, biasing means associated with said cam actuating means whereby to maintain contact between said actuating means and each cam follower means, and means cooperably associated with said cam actuating means for sensing the movement upon detecttion of a flaw in the tape material, said means being adapted through associated means to stop the movement of said tape material.

5. The device of claim 4 wherein the means for feeding the tape material to the device has associated therewith a sensing means for sensing snarls, twists and knots in the material fed to the device and accordingly stop said device.

References Cited by the Examiner
UNITED STATES PATENTS

| | | |
|---|---|---|
| 1,911,556 | 5/33 | De Staebler. |
| 2,692,499 | 10/54 | Kuch _____ 73—102 X |
| 2,924,969 | 2/60 | Clough et al. _____ 73—101 |

RICHARD C. QUEISSER, *Primary Examiner.*
ROBERT EVANS, JOSEPH P. STRIZAK, *Examiners.*